United States Patent [19]

Marto

[11] 4,325,210
[45] Apr. 20, 1982

[54] IDLER SHEAVE ASSEMBLY

[75] Inventor: John H. Marto, Oshkosh, Wis.

[73] Assignee: J. I. Case Company, Racine, Wis.

[21] Appl. No.: 217,718

[22] Filed: Dec. 18, 1980

[51] Int. Cl.³ .............................................. A01D 69/08
[52] U.S. Cl. .................................... 56/11.6; 56/15.8; 474/135
[58] Field of Search ............... 56/15.3, 11.6, DIG. 22, 56/15.8; 474/133, 134, 135, 137, 58

[56] References Cited

U.S. PATENT DOCUMENTS

| | | | |
|---|---|---|---|
| 2,611,148 | 9/1952 | Rappl | 474/135 |
| 3,380,313 | 4/1968 | Bulin | 474/135 |
| 3,465,607 | 9/1969 | Erdman | 474/137 |
| 3,633,699 | 1/1972 | Bishop et al. | 474/135 |
| 3,919,893 | 11/1975 | Boehm et al. | 474/135 |
| 4,102,114 | 7/1978 | Estes et al. | 56/153 |

*Primary Examiner*—Robert A. Hafer
*Attorney, Agent, or Firm*—Cullen, Sloman, Cantor, Grauer, Scott & Rutherford

[57] ABSTRACT

An idler sheave assembly for a lawn mower which is simple in construction and which maintains the tension in the mower drive belt at any vertical position of the mower. The idler sheave assembly is supported on a U-shaped yoke which is pivotally supported on the mower tow bar linkage. The assembly includes a mule sheave fixed to the yoke and a rock sheave rotatably supported on an annular sleeve. A torsion spring is spirally wound around the sleeve having one end fixed relative to the yoke and a free end rotatably biasing the rock shaft to tension the mower drive belt. The free end of the spring is received in an elongated slot in the yoke, providing a simple belt tension gage. The belt tension is adjusted by adjusting the angular position of the U-shaped yoke relative to the mower.

11 Claims, 5 Drawing Figures

IDLER SHEAVE ASSEMBLY

FIELD OF THE INVENTION

The present invention relates to improvements in spring actuated idlers for belt driven implements. More specifically, the present invention relates to an improved idler sheave assembly for a belt driven lawn mower or the like, wherein the mower is mounted beneath the tractor.

DESCRIPTION OF THE PRIOR ART

Tractor mounted mowers of the general type disclosed herein are now common in the industry. The mower assembly is generally suspended beneath the tractor on a linkage which permits vertical adjustment of the mower to adjust the cutting height of the blades. In a belt driven mower of this type, the endless drive belt is received around the power take-off pulley of the tractor and a driven pulley on the mower. Belt tension is maintained by a spring actuated idler sheave assembly which includes a fixed idler sheave and a spring actuated idler sheave which receive the opposed runs of the drive belt as disclosed in U.S. Pat. Nos. 3,380,313 and 3,465,607. The tension in the drive belt is adjusted by an adjustment screw which adjusts the idler sheaves into or out of engagement with the drive belt.

In the prior art, the idler sheave assembly is supported on the tractor adjacent its forward end and the mower is suspended beneath the tractor. Vertical adjustment of the mower thus varies the tension in the drive belt because the center distance between the power take-off pulley of the tractor and the driven pulley of the mower varies with the vertical position of the mower. This difference in belt tension is only partially compensated for by the spring actuated sheave. The prior art idler sheave assemblies thus fail to maintain a constant tension in the drive belt and the mower is generally not operable in the upper transport position.

Further, the idler sheave assemblies disclosed by the prior art are generally complex and difficult to adjust or maintain. Where a belt indicator is provided, the indicator does not form a functional part of the device and may be knocked out of alignment, particularly after rough handling. Finally, the idler sheave assemblies disclosed by the prior art are generally ridgedly mounted at the forward lower end of the tractor where the assembly is most vulnerable to damage or misalignment. The idler sheave assembly of this invention is relatively simple, rugged and pivotally suspended on the mower drawbar suspension to maintain a constant drive belt tension at all vertical positions of the mower.

SUMMARY OF THE INVENTION

The idler sheave assembly of this invention is particularly adapted to maintain constant drive belt tension in a tractor mounted mower or similar implement, wherein the mower is suspended beneath the tractor. The idler sheave assembly is rugged, yet relatively simple in construction. The belt tension may be easily determined and adjusted to accomodate drive belt wear.

The idler sheave assembly includes a support bracket, a fixed mule sheave rotatably supported on a first arm fixed to the bracket and a spring loaded rock sheave rotatably supported on a second arm which is generally parallel to the mule sheave support arm. The rock sheave support arm is connected to an annular sleeve, which is rotatably journaled on a shaft extending perpendicular to the arms and supported on the bracket. A torsion spring is spirally wound around the sleeve having a first end fixed relative to the bracket and a free end fixed relative to the rock sheave support arm, to spring bias the rock sheave relative to the fixed mule sheave. An adjustment means incrementally adjusts the position of the support bracket, relative to the mower, to adjust the tension of a drive belt received around the idler sheaves.

In the preferred embodiment, the bracket is a generally U-shaped yoke having a pair of upwardly extending legs and a midportion. The mule sheave support arm is fixed to the midportion of the yoke and the upwardly extending opposed legs are pivotally supported on the mower. The adjustment means includes an adjustment screw threadably received in a nut member on the yoke. The adjustment screw is fixed longitudinally relative to the tractor, such that relative vertical movement of the mower swings the U-shaped yoke to accomodate variation in the center distance between the power take-off pulley of the tractor and the driven pulley of the mower.

In the preferred embodiment, the free end of the torsion spring is received in an elongated slot in the yoke, providing a simple belt tension gage. Adjustment for proper drive belt tension is accomplished by turning the adjustment screw until the free end of the torsion spring is located in the center of the slot in the rock sheave support arm. The rock sheave will then be aligned with the fixed sheave, and the sheaves will maintain this parallel relation as the mower is adjusted vertically.

In the disclosed embodiment, the lawn mower is supported on a floating drawbar suspension including a pair of parallel tow bar links pivotally attached to the tractor at their forward ends and to the mower at their rearward ends. The upwardly extending legs of the U-shaped yoke are pivotally supported on the tow bar links, spaced rearwardly from the pivotal connections of the links to the tractor. The idler sheave assembly thus moves vertically with the mower, on a smaller arc. As described above, however, the adjustment screw will tilt the pivotally supported bracket to maintain a constant tension in the belt.

The idler sheave assembly of this invention thus maintains a constant tension in the mower drive belt at any vertical position of the mower and may be easily adjusted to accomodate belt wear by the belt adjustment screw. Other meritorious features of the idler sheave assembly of this invention will be more fully understood from the following description of the preferred embodiments, the appended claims and the drawings, a brief description of which follows.

DESCRIPTION OF THE PREFERRED EMBODIMENTS

Figure 1:
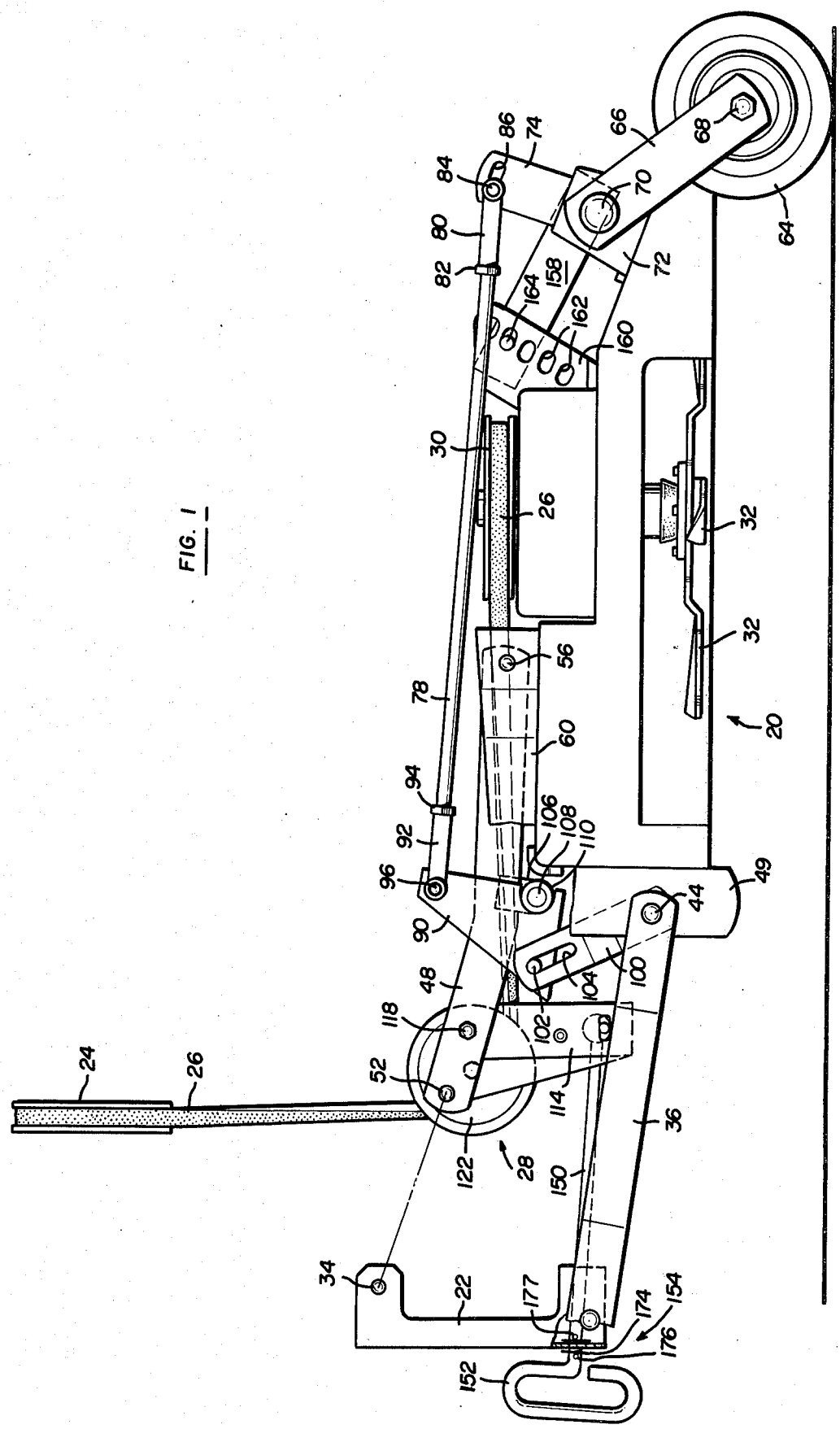
FIG. 1 is a side elevation of one embodiment of the mower suspension, with the mower in a raised position.

In the disclosed embodiment, the lawn mower assembly 20 is mounted beneath a tractor, not shown, on a drawbar suspension. The tractor may be a conventional lawn or garden type tractor having a horsepower range from about 5 to 20 HP, such as disclosed in the prior art. The tractor in the disclosed embodiment includes a C-shaped carriage hitch 22 and a power take-off pulley 24 which is mounted on the forward output shaft of the tractor, not shown. An endless drive belt 26 is received on the power take-off pulley 24 of the tractor, around the idler sheaves of the idler sheave assembly 28, and around the mower driven pulley 30, to drive the rotary mower blades 32. The tractor, which does not form a part of the invention, may be any conventional tractor. The details of the drawbar suspension and mower assembly 20, which do not form a part of this invention, are more fully described in copending applications, Ser. No. 217,617 and, which are incorporated herein by reference.

The forward end of the mower assembly 20 is supported on a drawbar suspension, which includes two pair of parallel links. The lower parallel links 36 and 38, are pivotally connected to the carriage hitch 22 at 40 and 42, respectively. The carriage hitch is attached to the forward end of the tractor by bolts or the like through apertures 34 in the carriage hitch. The rearward ends of the lower links 36 and 38 are pivotally connected to the mower frame 49 by pivotal connections 44 and 46, respectively. In the disclosed embodiment, the pivotal connections are provided by metal pins, which are received through apertures in the links and the tractor chassis or mower frame, and which are retained by cotter pins, not shown. The linkage may thus be easily disassembled, as required.

The parallel upper links 48 and 50 are pivotally connected to the tractor chassis at their forward ends by pins 170 (see FIG. 5) received through pivot apertures 52 and 54, respectively. The rearward ends of the upper parallel links are pivotally connected to mower frame member 60 by pivotal connections 56 and 58, respectively. As shown, the upper parallel links 48 and 50 are generally parallel to the lower parallel links 36 and 38, forming two pairs of parallelograms, about which the forward end of the mower assembly may be raised or lowered.

Figure 3:
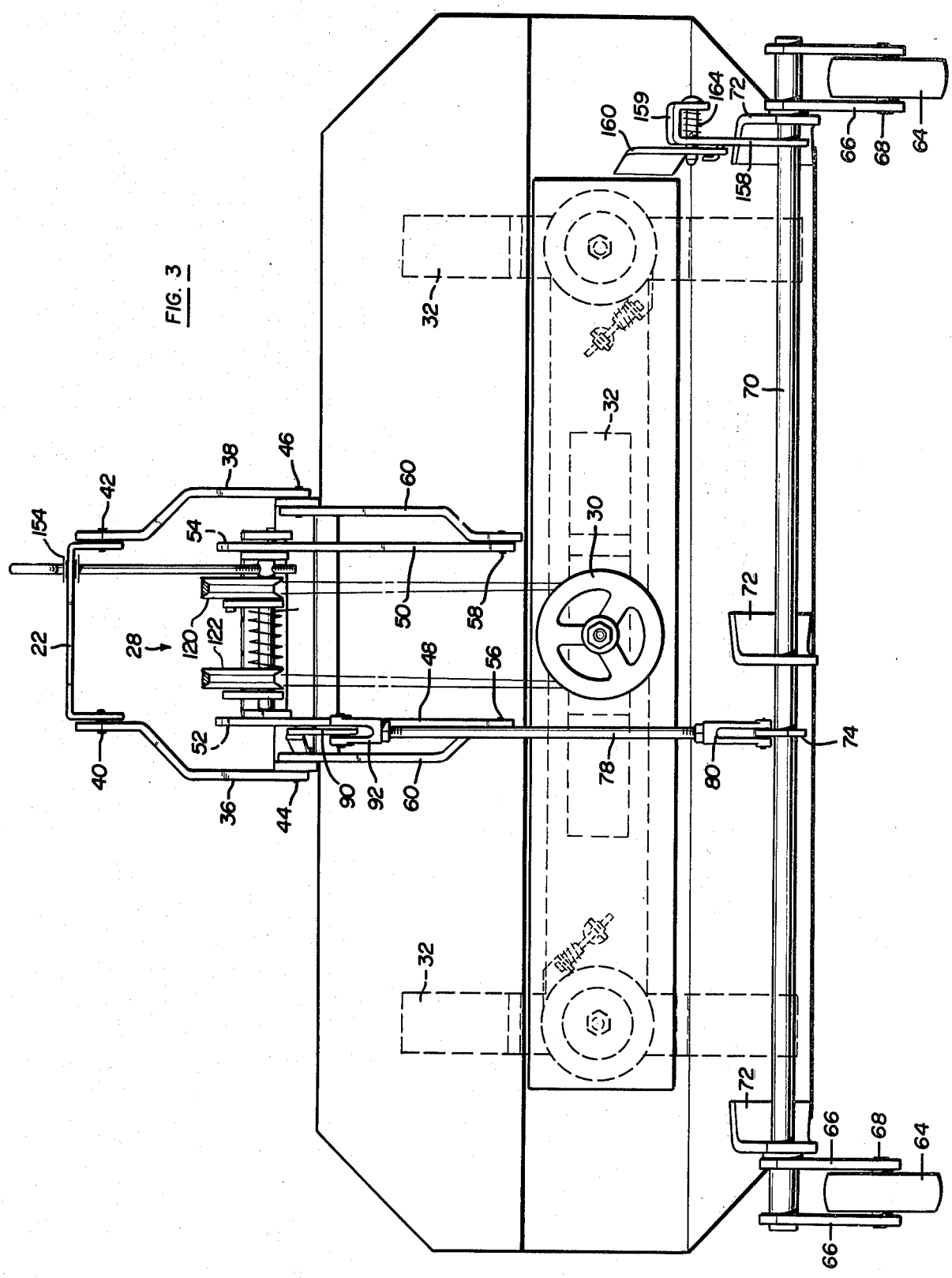
FIG. 3 is a top elevation of the mower and suspension shown in FIGS. 1 and 2.

The rearward end of the mower assembly is supported on gage wheels 64. The gage wheels are rotatably supported on wheel support arms 66 by conventional bolt and bearing assemblies 68. The wheel support arms are connected to rock shaft 70, which is rotatably supported at the rearward end of the mower by brackets 72. The brackets are welded or otherwise secured to the mower frame, as best shown in FIG. 3. A lift arm 74 is connected to the rock shaft to form a bellcrank lever with the rock shaft and wheel support arms, such that rotation of the wheel support arms 66, about rock shaft 70, rotates the lift arm 74.

The lift arm 74 is operably connected to the drawbar linkage by a tie rod 78. The tie rod includes a rear clevis 80 which is threadably received on the rearward end of the tie rod and retained by nut 82. The clevis is pivotally connected to the upper free end of the lift arm 74 by pivot pin 84, which is received in an arcuate slot 86 to accomodate the rotational motion of the lift arm about rock shaft 70. The forward end of the tie rod is pivotally connected to a bellcrank lever 90 by clevis 92, which is threadably received on the forward end of the tie rod and retained by nut 94. The clevis is pivotally connected to the upper free end of the bellcrank by pivot pin 96. As described, above, the pivot pins in the disclosed embodiment are retained by cotter pins, not shown. The bellcrank lever 90 is pivotally connected to one of the upper parallel links 48 and one of the lower parallel links 36 to raise the forward end of the mower in parallel relation to the rearward mower end and maintain the rotary blades level for an even cut.

The bellcrank lever is connected by a leveler link 100 to the pivotal connection 44 between the lower link 36 and the mower frame member 49. The upper end of the leveler link is pivotally connected to the bellcrank lever by pin 102, which is received in a lost motion slot 104 in the leveler link. The lost motion slot will accomodate the arcuate motion of the bellcrank lever. The bellcrank lever is connected to one of the upper links 48 by a rectangular tab 106, which is welded or otherwise secured to the upper link 48. A pivot pin 108 is rotatably received in a bearing sleeve 110, which is secured to or integral with the tab 106. The bellcrank lever 90 is thus pivotally connected to one of the upper and lower parallel links, 48 and 36, respectively, and to the tie rod 78 at its free end. Longitudinal movement of the tie rod 78 will thus rotate the bellcrank lever to adjust the height of the forward end of the mower.

Figure 4:
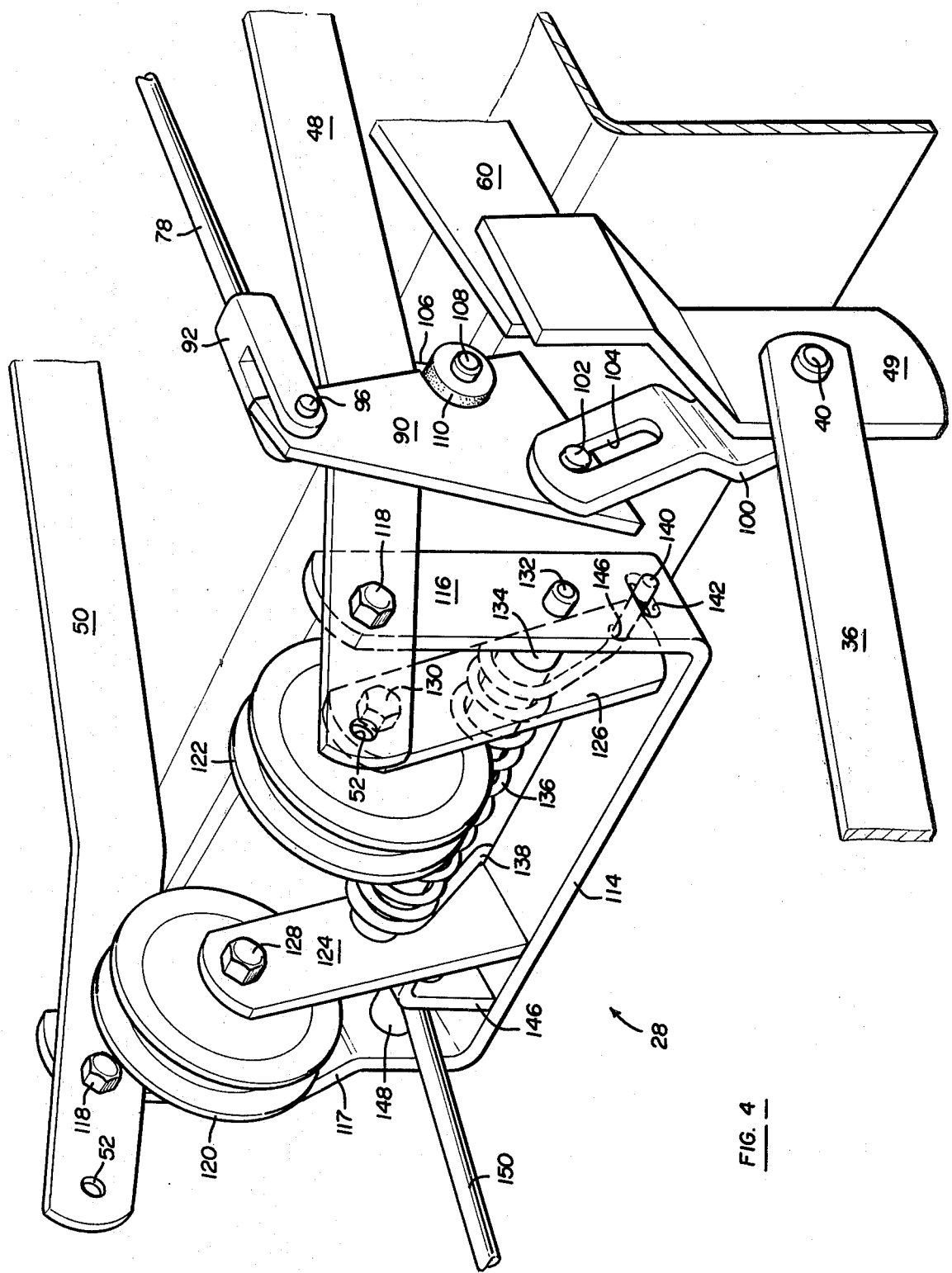
FIG. 4 is an elevated perspective view of one embodiment of the idler sheave assembly and the associated suspension linkage.
Figure 5:
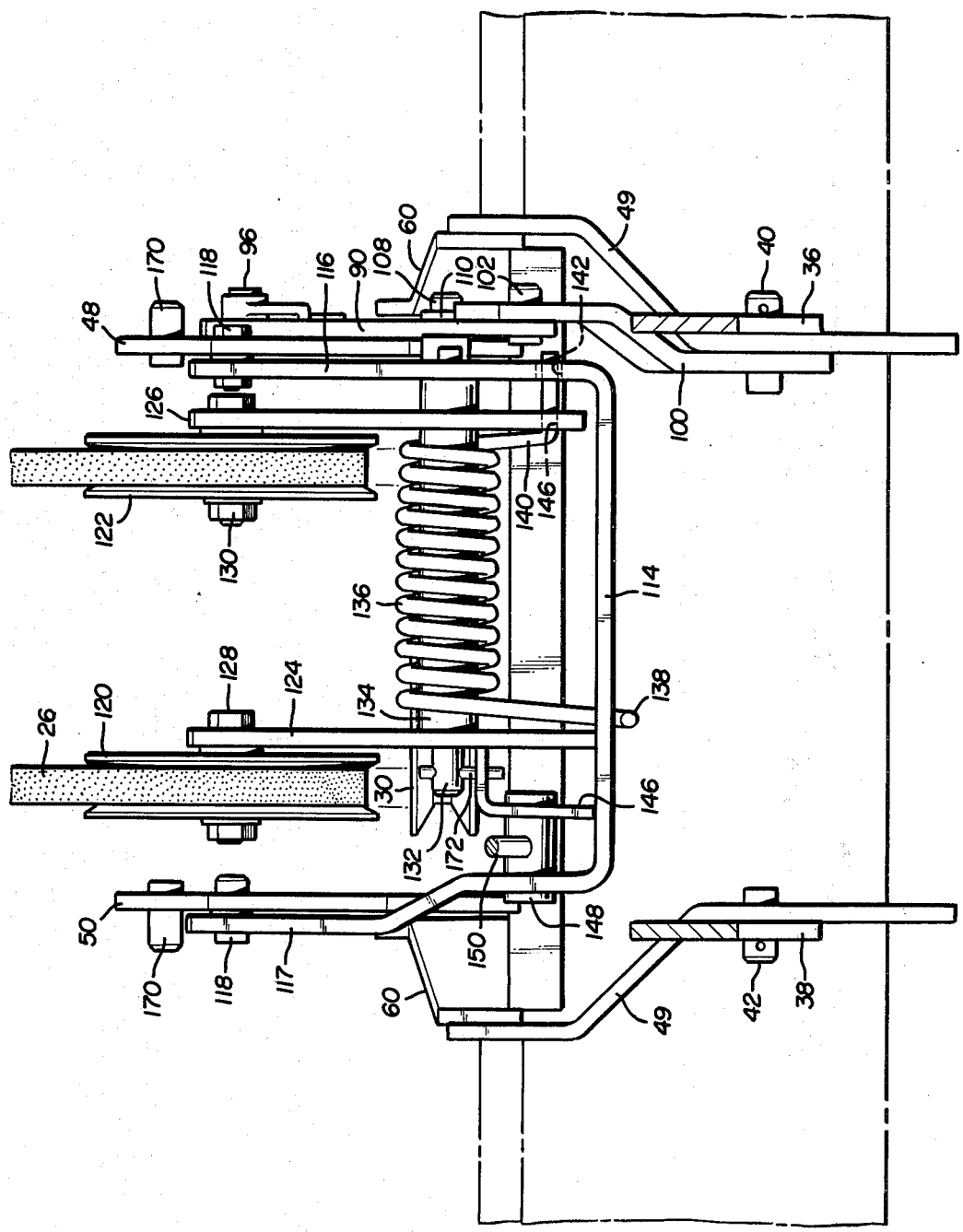
FIG. 5 is a front, partially cross-sectioned view of the idler sheave assembly in the direction of view arrows 5—5 in FIG. 2.

The idler sheave assembly 28 of this invention is supported on the upper parallel links 48 and 50 of the drawbar suspension by a U-shaped bracket 114, as best shown in FIGS. 4 and 5. The U-shaped bracket includes a pair of upwardly extending legs 116 and 117, which are pivotally supported and connected to the upper links 48 and 50 by bolts 118. The preferred embodiment of the idler sheave assembly includes a fixed mule sheave 120 and a spring biased rock sheave 122. The mule sheave is rotatably supported on a support arm 124 by a bolt and bearing assembly 128. The fixed support arm 124 is welded or otherwise secured to the bite or midportion of the U-shaped bracket 114. The rock sheave 122 is rotatably supported on a spring loaded arm 126 by a bolt and bearing assembly 130.

The spring loaded arm 126 is rotatably supported on a shaft 132 and bearing sleeve 134. The shaft is received through apertures in support arm 124 and the upwardly extending leg 116 of the bracket. The shaft 132 is fixed relative to the bracket 114 by lock pin 172. The lock pin is received through the shaft 132 and bracket 146, as shown in FIG. 5. The sleeve 134 is rotatably journaled on the shaft 132. The rock sheave support arm 126 is welded or otherwise connected to the sleeve to rotate therewith. A torsion spring 136 is wound on the sleeve and tensioned to spring bias the rock sheave against the tension of the drive belt 26. One end 138 of the torsion spring is hook-shaped and fixed on the midportion of the bracket 114. The free end 140 of the torsion spring is received through a slot 146 in the lower end of the rock sheave support arm 126 to spring bias the support arm and the distal end of the spring extends through an elongated slot 142 in leg 116 of the bracket. The free end 140 of the torsion spring serves as an indicator of belt tension, as described below.

The drive belt tension is adjusted by an adjustment screw 150, which is threadably received in a barrel nut 148 rotatably attached to the bracket 114. The barrel nut is rotatably retained in opposed aligned apertures in leg 117 of the U-shaped bracket and the L-shaped support bracket 146. The bracket 146 is welded or otherwise secured to the midportion of the bracket 114 and fixed mule sheave support arm 124. The adjustment screw includes a handle portion 152 which extends beyond the carriage hitch 22 as shown in FIG. 1 and a roll pin assembly 154 which prevents longitudinal movement of the adjustment screw, while permitting rotational movement. The roll pin assembly includes washers 174 on opposed sides of the carriage hitch, which are retained against longitudinal movement along the adjustment screw by cotter pin 176 and roll pin 177.

Rotational movement of the adjustment screw 150 threads the screw in the barrel nut 148 to adjust the angular position of the U-shaped bracket 114 about the pivotal connections 118 of the bracket support legs 116 and 117. The pivotal angular movement of the midportion of the U-shaped bracket 114 toward the carriage hitch 22 reduces the tension in the belt, as the mule sheaves 120 and 122 are biased against the tension in the belt 26. Rearward movement of the bracket, by threaded movement of the screw 150, reduces the tension in the drive belt 26. The belt tension may thus be easily adjusted by rotation of adjustment screw 150.

Figure 2:
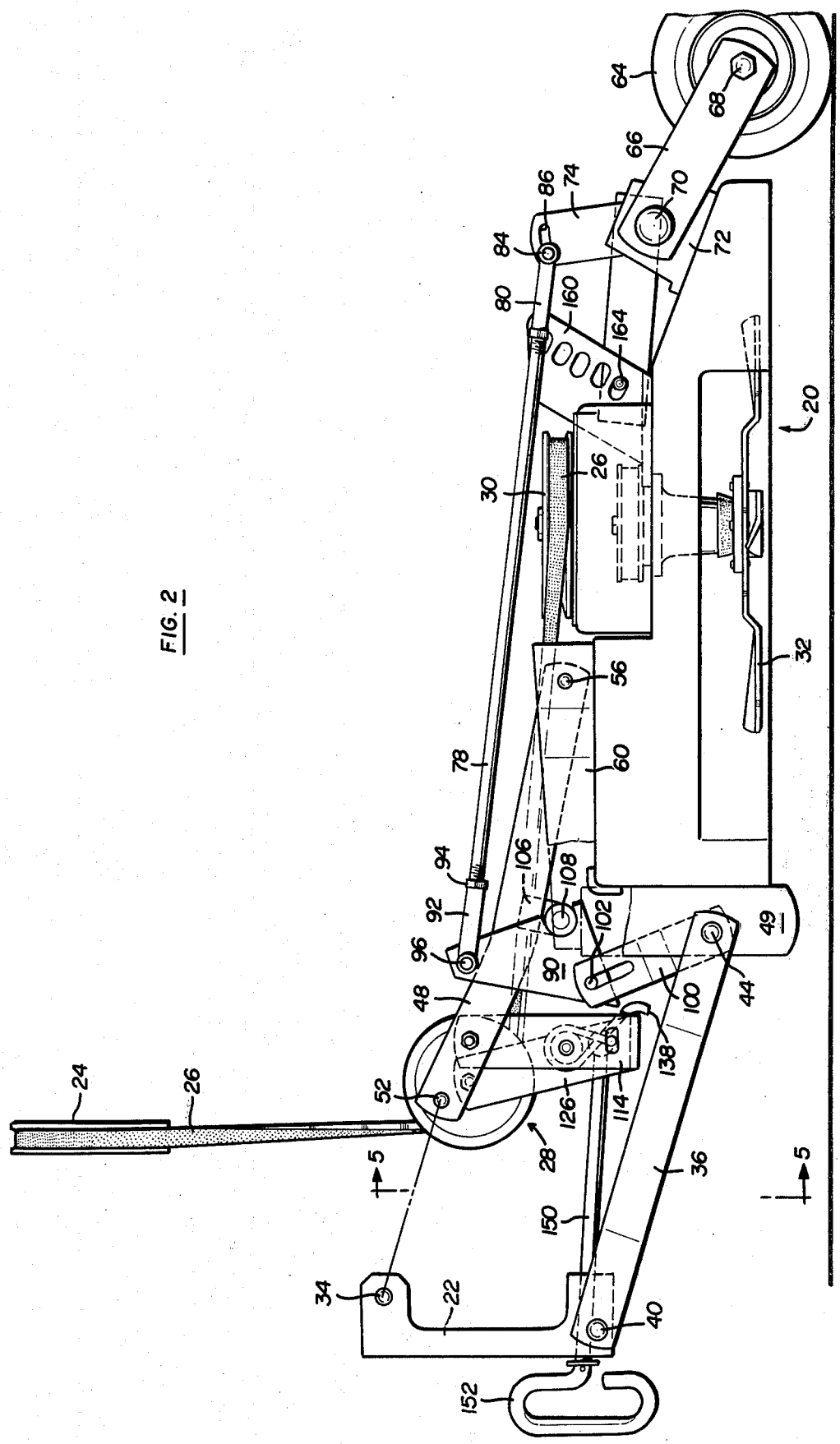
FIG. 2 is a side elevation of the lawn mower suspension shown in FIG. 1, with the mower lowered.

The mower assembly 20 may be raised or lowered in parallel relation, briefly, as follows. When the wheel support arms 66 are rotated about rock shaft 70, the gage wheels 64 are swung beneath the rearward end of the mower to raise or lower the rearward end of the mower as shown in FIGS. 1 and 2. Clockwise rotation of the wheel support arms 66 (from FIG. 2 to FIG. 1) results in a clockwise rotation of lift arm 74 and tensioning of the tie rod 78. The tensioning of the tie rod 78 results in a clockwise rotation of bellcrank lever 90 and a simultaneous upward movement of the forward end of the mower about the pivotal connections of the drawbar linkage to the tractor chassis and carriage hitch. The forward and rearward ends of the mower are thus raised in parallel relation, maintaining the rotary blades 32 in parallel relation for an even cut. Counter-clockwise rotation of wheel support arm 66 (from FIG. 1 to FIG. 2) moves tie rod 78 to the left in FIG. 1, rotating bellcrank lever 90 in a counter-clockwise direction and lowering the forward end of the mower in parallel relation.

The mower is retained at predetermined heights by height adjustment arm 158, which is secured to rock shaft 70. The free end of the height adjustment arm 158 is U-shaped, as shown in FIG. 3, and includes a spring biased lock pin 164. The mower includes a sector plate 160 having a series of generally vertically spaced slots 162 which receive the spring loaded stud 164. The stud will thus retain the mower at any one of five preselected heights when the stud is received in one of the slots 162. In the disclosed embodiment, the mower has five height adjustments, including an upper transport position wherein the blades are spaced approximately five inches above the ground. The mower will cut at any height, including the upper transport position.

The unique pivotal suspension of the idler sheave assembly 28 on the upper parallel links 48 and 50 of the drawbar suspension maintains a constant tension in the drive belt 26 as the mower assembly 20 is raised or lowered, as now described. The suspension of the idler sheave assembly 28 on the upper parallel links 48 and 50 raises or lowers the bracket 114 and the idler sheave assembly with the mower. The vertical motion of the idler sheave assembly does not however fully compensate for the change in the center distance between the power take-off pulley 24 and the mower driven pulley 30 as the mower is raised or lowered. The drive belt tension would thus vary with mower height, except for the unique suspension of this invention which causes the idler sheaves to self-relocate to maintain a constant belt tension. As the mower is raised, for example, the idler sheave bracket 114 is raised a lesser distance, tending to reduce the tension in the belt. The adjustment screw is however fixed against longitudinal movement by roll pin assembly 154. The adjustment screw thereby angularly adjusts the bracket and idler sheave assembly to maintain a constant tension in the belt as the mower is raised or lowered.

The tension in the drive belt 26 is indicated by the position of the free end 140 of the tension spring 136 in the elongated slot 142 of the bracket 114. When the idler sheaves 120 and 122 are aligned, the free end 140 of the torsion spring is centered in the slot 142. This alignment indicates proper tension in the drive belt. This is a function of the design and adjustment at the factory. Improper belt tension—to 0 low or too high—is indicated by location of the free end of the spring at either end of the slot. As described above, the tension in the belt is then adjusted by rotation of belt adjustment screw 150.

It will be understood by those skilled in the art that various modifications may be made to the disclosed mower assembly and tractor, which do not form a part of the invention claimed herein. Further, the mower drawbar suspension and rotary blade control are more fully disclosed and claimed in separate patent applications, which are incorporated herein by reference. Having fully described the idler sheave assembly of this invention, it will be understood that various modifications may be made to the structure within the perview of the appended claims.

I claim:

1. An idler sheave assembly for a belt driven lawn mower having a flexible endless drive belt, said idler sheave assembly comprising:
   a support bracket, a fixed mule sheave rotatably supported on a first arm fixed to said bracket, a spring loaded rock sheave rotatably supported on a second arm generally parallel to said first arm, a shaft generally perpendicular to said arms extending through coaxially aligned apertures in said arms, an annular sleeve rotatably journaled on said shaft received through said second arm aperture, said second arm fixed relative to said sleeve and rotatable therewith, a torsion spring spirally wound around said sleeve having a first end fixed relative to said bracket and a free end fixed relative to said second arm spring biasing said spring loaded rock sheave relative to said fixed mule sheave, and an adjustment means adapted to incrementally adjust the position of said support bracket relative to said mower to adjust the tension of a drive belt received around said sheaves.

2. The idler sheave assembly defined in claim 1, characterized in that said support bracket is a generally U-shaped yoke having a pair of upwardly extending opposed legs and a midportion, said legs pivotally supported on said mower and said arms supported between said yoke legs on said midportion with the first arm fixed on said yoke midportion.

3. The idler sheave assembly defined in claim 2, characterized in that said yoke leg adjacent said second arm includes an elongated slot which receives said spring free end, whereby the tension in said spring and a drive belt received on said sheaves may be gaged by the location of said spring free end in said slot.

4. The idler sheave assembly defined in claim 2, characterized in that said adjustment means includes a threaded nut member attached to said yoke and a threaded bolt member received in said nut member incrementally adjusting the position of said yoke relative to said mower.

5. An idler sheave assembly for a lawn mower supported on a tractor on a drawbar suspension, said tractor having a power take-off pulley and said mower having an idler sheave assembly and a driven pulley, a continuous flexible drive belt received about said pulleys and said idler sheave assembly maintaining the tension in said flexible drive belt, said drawbar suspension including a pair of parallel tow bar links pivotally attached to said tractor at their forward ends and pivotally supporting said mower at their rearward ends, and height adjustment means adapted to adjust the height of said mower relative to said tractor about the pivotal connections of said tow bar links, the improved idler sheave assembly comprising:

a generally U-shaped yoke having a midportion and opposed upwardly extending legs pivotally supported on said tow bar links spaced from the pivotal connections of said links to said tractor, a fixed mule sheave rotatably supported on a first arm fixed on said yoke midportion, a spring loaded rock sheave rotatably supported on a second arm generally parallel to said first arm, a support shaft generally perpendicular to said arms supported on said yoke and extending through apertures in said arms, an annular bearing sleeve rotatably journaled on said shaft, said second arm fixed to said sleeve and rotatable therewith, a torsion spring spirally wound around said sleeve having a first end fixed relative to said yoke and a free end fixed relative to said second arm spring biasing said spring loaded rock sheave relative to said fixed mule sheave, and an adjustment means adapted to incrementally adjust the tension in said flexible drive belt by incrementally adjusting the position of said yoke about said pivotal supports to said tow links, said yoke and idler sheave assembly maintaining tension in said flexible guide belt during adjustment of the height of said mower, said sheave assembly moving vertically with said tow links.

6. The idler sheave assembly defined in claim 5, characterized in that said upwardly extending yoke leg adjacent said second arm including an elongated slot which receives said spring free end, whereby the tension in said spring and said flexible drive belt may be gaged by the location of said spring free end in said slot.

7. The idler sheave assembly defined in claim 5, characterized in that said belt tension adjustment means includes a threaded nut member attached to said yoke and a threaded bolt member received in said nut member incrementally adjusting the position of said yoke about said pivotal supports to said tow links.

8. The idler sheave assembly defined in claim 5, characterized in that said support shaft is received through apertures in said first arm and one of said yoke legs, said shaft being fixed relative to said yoke and said sleeve extending between said fixed first arm and said one yoke leg and rotatably journaled on said shaft.

9. The idler sheave assembly defined in claim 7, characterized in that said spiral torsion spring has one end fixed to said yoke midportion and a free end received through a slot in said second arm spring biasing said second arm and rock sheave relative to said fixed mule sheave, the free end of said spring extending through an elongated slot in said one yoke leg whereby the tension in said spring and said drive belt may be gaged by the location of said spring free end in said slot.

10. The idler sheave assembly defined in claim 9, characterized in that said adjustment means comprises a barrel nut pivotally connected to said yoke and an adjustment screw having a threaded end received in said barrel nut, said adjustment screw fixed longitudinally relative to said tractor and rotatable to adjust the angular relation of said U-shaped yoke midportion about said pivotal supports to said tow links to adjust the tension in said flexible drive belt.

11. The idler sheave assembly defined in claim 5, characterized in that said adjustment means comprises an adjustment screw threadably received in a nut member pivotally supported on said bracket, said adjustment screw fixed longitudinally relative to said tractor and rotatable to adjust the angular relation of the U-shaped yoke about said pivotal supports, said adjustment screw maintaining the tension in said drive belt as said mower is adjusted vertically by tilting said U-shaped yoke to maintain a constant distance between said power take-off pulley and said mower driven pulley around said idler sheaves.

* * * * *